United States Patent
Mori et al.

(10) Patent No.: US 6,490,187 B2
(45) Date of Patent: Dec. 3, 2002

(54) SEMICONDUCTOR ELECTRIC POWER CONVERSION DEVICE

(75) Inventors: Kazuhisa Mori, Hitachi (JP); Asako Koyanagi, Hitachi (JP); Satoshi Fukuda, Hitachinaka (JP); Toshisuke Mine, Mito (JP); Takao Kishikawa, Hitachinaka (JP); Tomoharu Sakoda, Hitachinaka (JP)

(73) Assignees: Hitachi, Ltd., Tokyo (JP); Hitachi Building Systems Co., Ltd., Tokyo (JP)

( * ) Notice: Subject to any disclaimer, the term of this patent is extended or adjusted under 35 U.S.C. 154(b) by 70 days.

(21) Appl. No.: 09/946,596

(22) Filed: Sep. 6, 2001

(65) Prior Publication Data

US 2002/0034089 A1 Mar. 21, 2002

(30) Foreign Application Priority Data

Sep. 6, 2000 (JP) ........................ 2000-269601

(51) Int. Cl.[7] ................................................ H02M 1/00
(52) U.S. Cl. ...................................................... 363/147
(58) Field of Search ............................... 363/147, 144, 363/17

(56) References Cited

U.S. PATENT DOCUMENTS 4,670,833 A * 6/1987 Sachs ........................ 361/715

5,132,896 A 7/1992 Nishizawa et al. ......... 363/144

FOREIGN PATENT DOCUMENTS

JP  8-19245  6/1994

* cited by examiner

Primary Examiner—Shawn Riley
(74) Attorney, Agent, or Firm—Crowell & Moring LLP

(57) ABSTRACT

A semiconductor electric power conversion device includes a converter unit and an inverter unit, each having a group of parallel capacitors and multiple switching elements. Subdivided positive conductive connections associated with the converter unit and divided positive conductive connections associated with the inverter unit are formed at a positive side conductor connected to capacitors; while divided negative conductive connections associated with the converter unit and divided negative-polarity conductive connections associated with the inverter unit are formed at a negative polarity side conductor, connected to capacitors. The positive and negative polarity conductors have a multilayer structure with a dielectric plate interposed therebetween. Converter positive and negative polarity conductors are formed into a multilayer structure with the dielectric plate sandwiched between them, and inverter positive and negative polarity conductors are formed into a multilayer structure with the dielectric plate sandwiched therebetween.

7 Claims, 10 Drawing Sheets

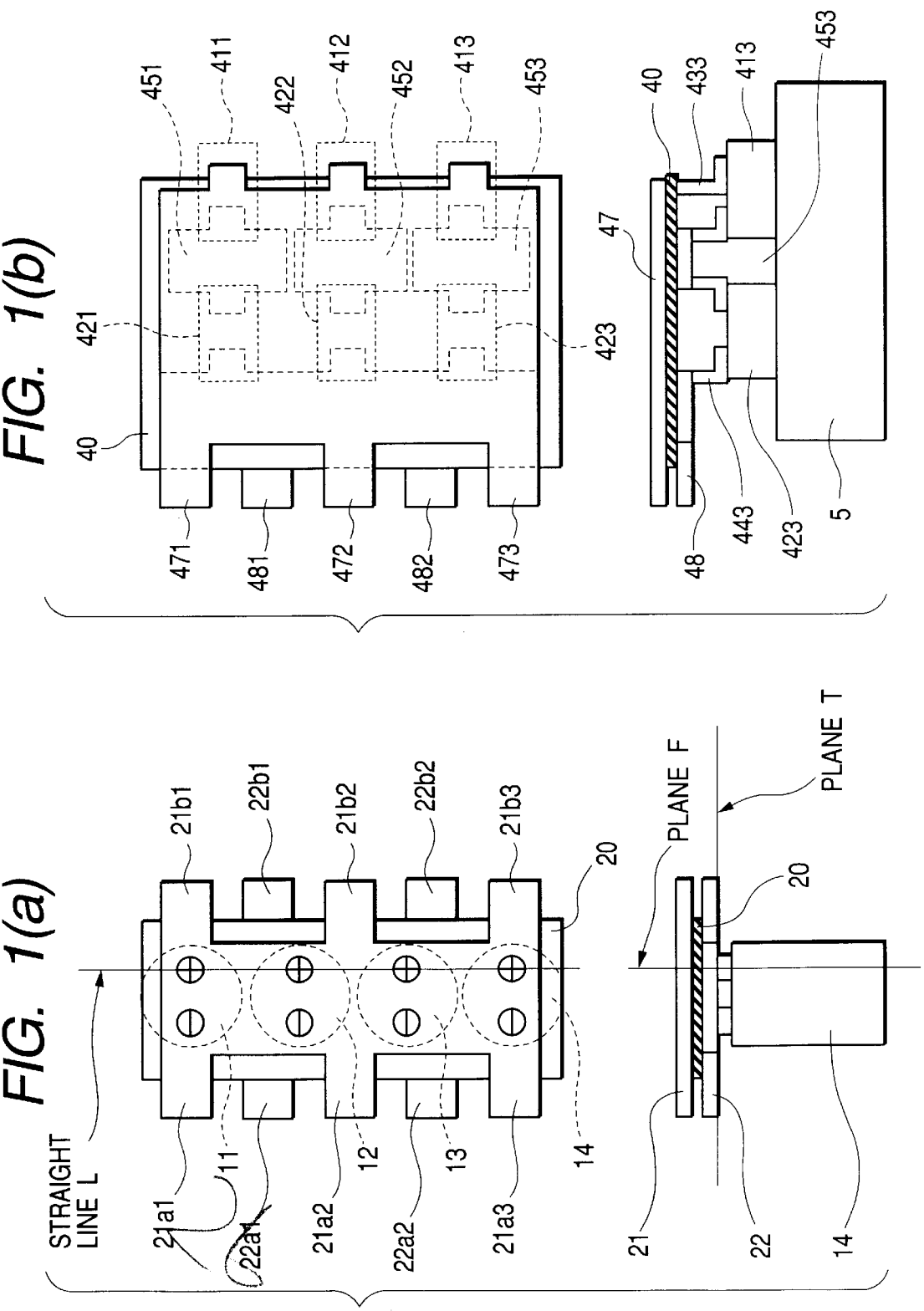

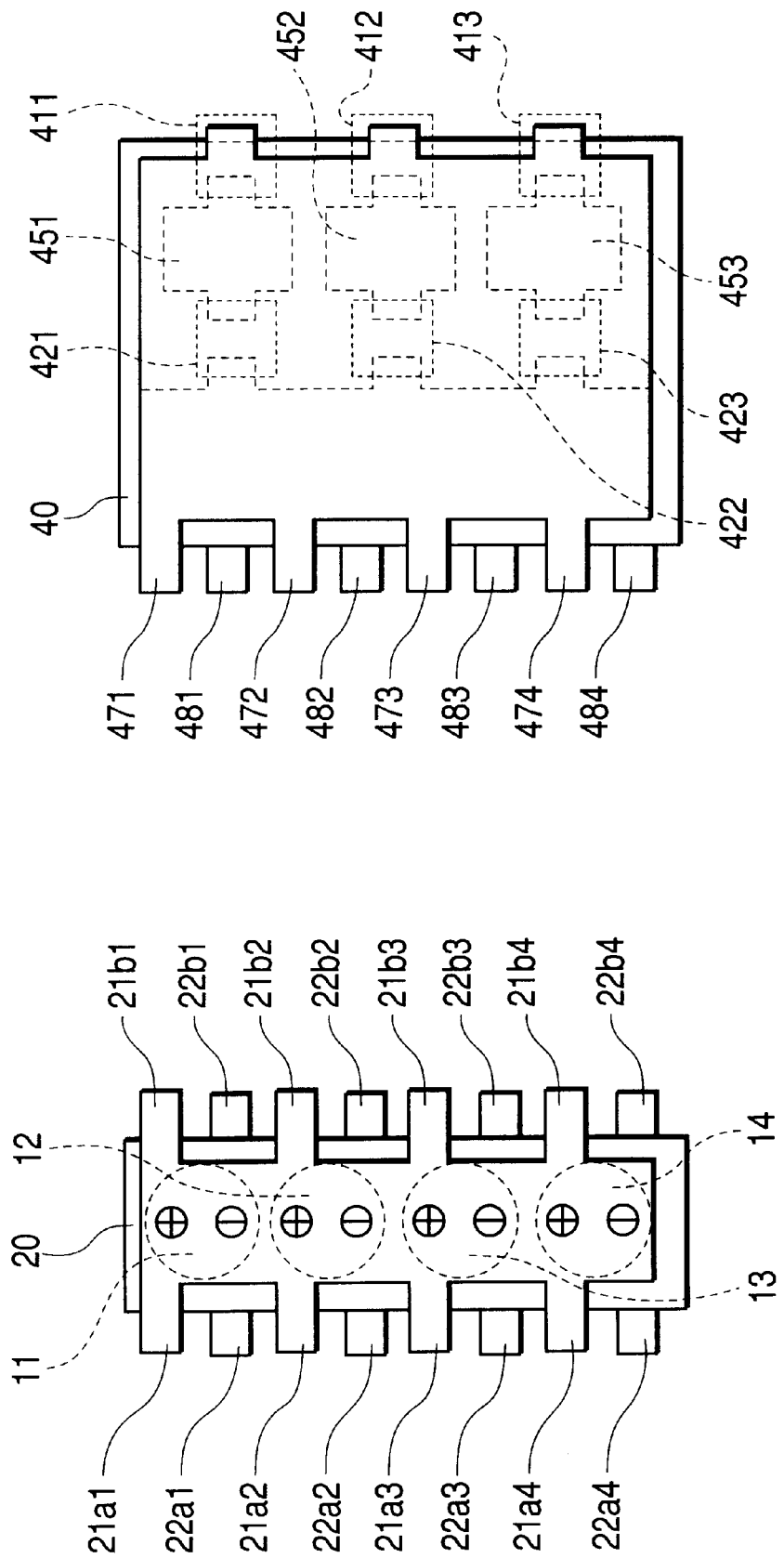

US 6,490,187 B2

SEMICONDUCTOR ELECTRIC POWER CONVERSION DEVICE

BACKGROUND OF THE INVENTION

The present invention relates in general to semiconductor devices for electric power conversion using semiconductor switching elements and, in more particular, to a technique for suppressing occurrence of rapid potential variation or "jump-up" of voltages during switching operations while reducing the device in size or dimension.

In recent years, electric power conversion devices employing high-speed semiconductor switching elements typically including insulated-gate bipolar transistors (IGBTS) have been used in a wide variety of technical fields. As the capacity increases, the power converter devices are in many cases configured from a converter and more than one smoothing capacitor plus an inverter rather than a mere rectifier circuit in order to let electrical power "reincarnate" to the power supply.

As one example of such approach, the circuit configuration of a three-phase power converter apparatus such as a variable frequency power supply is shown in FIG. 3. In brief, a converter 3 and an inverter 4 are connected together via a group of smoothing capacitors 1. The converter 3 is generally constituted from IGBT modules 311–323 and conductors 331–363 for connection therebetween.

In addition, the IGBT modules 311–323 are each formed of a switching element (here, IGBT) and a diode operatively associated therewith. The positive polarity-side conductors 331–333 are connected through a common conductor 21a to a conductor 21 for connecting capacitors— positive polarities together via a common conductor 37. Similarly the negative polarity-side conductors 341–343 are connected through a common conductor 22a to a conductor 22 for connecting the capacitors' negative polarities together via a common conductor 38. As in the converter 3, the inverter 4 is similarly constituted from IGBT modules 411–423 and conductors 431–463, wherein positive polarity-side conductors 431–433 are connected through a common conductor 21b to a conductor 21 for connecting the capacitors' positive polarities together via a common conductor 47. Similarly negative polarity-side conductors 441–443 are connected via a common conductor 22b to a conductor 22 for connecting the capacitors' negative polarities together by a common conductor 48. Although not specifically shown in the drawing, an alternate current (AC) power supply part is connected to the converter 3 via AC conductors 361–363 whereas a load, such as a motor, is coupled to the inverter 4 via AC conductors 461–463.

In the power converter device thus arranged, a voltage can potentially jump up in turn-off events due to an energy being accumulated upon power-up or electrization to the lead wire inductance of circuitry. If this "jump-up" voltage potentially goes beyond the inherent withstanding or breakdown voltage level of switching elements, then the elements might lead to destruction; thus, an attempt is made to suppress such voltage jump-up by connecting a snubber circuit, although not shown in FIG. 3. Unfortunately the use of such snubber circuit serves as a bar to achievement of the device downsizing; thus, it is important to suppress or minimize the lead wire inductance of the circuit. In order to suppress such circuit lead wire inductance, a variety of approaches have been employed until today including, but not limited to, a technique for using a multilayer conductor structure with reverse-direction currents opposing each other.

One example is disclosed in Japanese Application Patent Laid-Open Publication No. Hei 08-19245, wherein the lead wire inductance is reduced by arranging a group of semiconductor switching elements and a capacitor group so that all of them are arranged by a multilayered conductor.

However, in cases where the power converter device further increases in size resulting in a likewise increase in parallel array number of capacitors and/or an increase in dimensions of switching elements, the multilayer conductor per se is made larger in size, which leads to difficulties in the manufacture of such multilayer conductor while at the same time increasing workloads for connection to respective terminals during conductor connection processes, resulting in unwanted increases in production costs.

SUMMARY OF THE INVENTION

The prior art electric power conversion device made up from a plurality of semiconductor switching elements and a plurality of capacitors in the way stated above is encountered with a problem that unwanted increases in costs in conductor manufacturing parts assembly processes occur due to inductance reduction for suppression of a rapidly potentially varying or "jump-up" voltage in accordance with an increase in capacity of the power conversion device.

It is therefore a primary object of the present invention to provide a semiconductor electric power conversion device preferably adapted to achieve inductance reduction by use of conductors of simplified structure to thereby suppress any possible jump-up voltages.

To attain the foregoing object the instant invention provides an improved semiconductor electric power conversion device including a converter unit and an inverter unit each having a group of parallel-connected capacitors and a plurality of positive polarity side switching elements being connected to a positive polarity terminal of the capacitor group plus a plurality of negative polarity side switching elements as connected to a negative polarity terminal of the capacitor group, wherein the device comprises a first connection section for connecting together a first conductor being connected to the positive terminal of the capacitor group and a second conductor as connected to the positive polarity of the positive polarity side switching elements making up the inverter and a second connection section for connecting thereto a third conductor as connected to the positive polarity of the positive polarity side switching elements making up the inverter, and a third connection section for connecting together a fourth conductor being connected to the negative terminal of the capacitor group and a fifth conductor as connected to the negative polarity of the negative polarity side switching elements making up the converter and a fourth connection section for connecting thereto a sixth conductor as connected to the negative polarity of the negative polarity side switching elements constituting the inverter, and wherein the first conductor and the fourth conductor are formed to have a multilayer structure while letting the second conductor and fifth conductor be formed into a multilayer structure with the third conductor and sixth conductor being formed into a multilayer structure.

It should be noted here that respective capacitors making up the capacitor group are on the same plane while disposing the first connection section and the third connection section on the same side with respect to an infinite plane containing therein a line segment coupling together at least two terminals of the terminals of the capacitor group and being at right angles to the aforesaid plane and also disposing the second connection section and the fourth connection section be disposed at the opposite side thereto, wherein the first to fourth connection sections have a plurality of subdivided connection conductors with the first connection section and the third connection section being disposed in close proximity to each other in the state that these are electrically isolated from each other and also with the second connection section and fourth connection section being disposed adjacent to each other in the state that these are electrically isolated from each other.

In addition, respective capacitors making up the capacitor group are all the same in shape and are disposed in the same direction.

Additionally, the subdivided connection conductors of the first to fourth connection sections are all the same in width.

Additionally the connection conductors of the first connection section and the second connection section are subdivided into the same number of portions whereas the connection sections of the third connection section and the fourth connection section are divided into the same number of portions.

Additionally a total number of the subdivided connection conductors of the first connection section and the third connection section is greater than the number of the parallel-connected capacitors in the capacitor group.

Additionally a plurality of single-phase units are connected for constitution of a multiple-phase electric power conversion unit.

BRIEF DESCRIPTION OF THE DRAWINGS

FIGS. 1(a)–1(b) are first preferred embodiments of the semiconductor electric power conversion device of the present invention.

FIGS. 4(a)–4(b) are second embodiments of the invention.

DESCRIPTION OF THE PREFERRED EMBODIMENTS

Figure 2A:
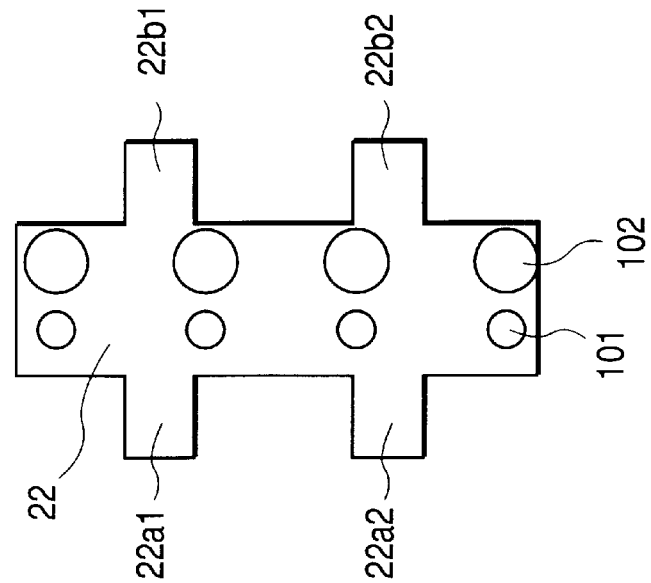
FIGS. 2(a)–2(c) are diagrams showing plan views in the first embodiment of this invention.

Several preferred embodiments of the present invention will now be set forth in detail with reference to the accompanying drawings below.

FIG. 1 shows a first embodiment of the semiconductor electric power conversion device of this invention. FIG. 1(a) depicts structures of a group of capacitors 1 and a pair of positive polarity side conductor 21 and negative polarity side conductor 22 which are connected to the capacitors; (b) shows one example of the structure of an inverter unit 4 as connected to these components. Although not specifically illustrated herein, a converter unit 3 is arranged so that it is connected on the left side of the capacitor group 1 in a way similar to that of the inverter unit 4.

In FIG. 1(a), respective capacitor terminals are on a plane T, wherein capacitor terminals of the positive polarity are aligned along a line segment L. For an infinite plane F passing through this line segment L and being at right angles to the plane T, positive polarity conductor connection (connecting conductor) sections 21a1 to 21a3 and negative polarity conductor connection (connecting conductor) sections 22a1–22a2 which are associated with the converter unit 3 are on the left side whereas positive polarity conductor connection (connecting conductor) sections 21b1 to 21b3 and negative polarity conductor connection (connecting conductor) sections 22b1–22b2 associated with the inverter unit 4 are on the right side. Additionally, these connection sections are arranged so that potentially different ones, e.g. 21a1 and 22a1, are laid out adjacent to each other in the state that they are electrically isolated from each other.

Figure 2B:
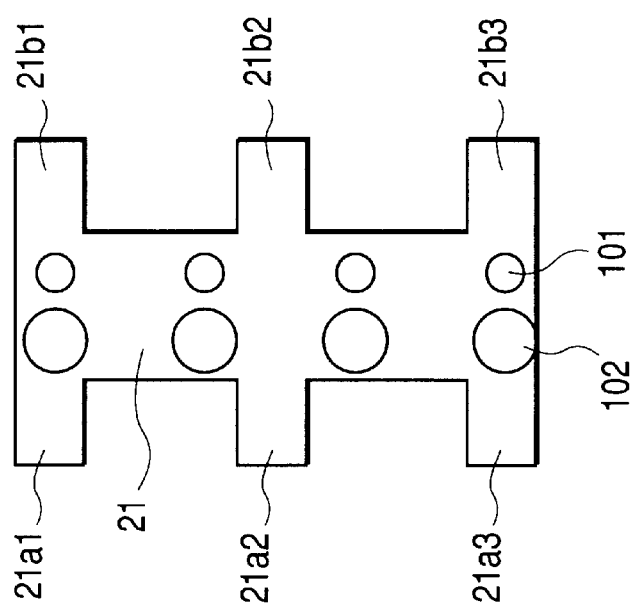
Figure 2C:
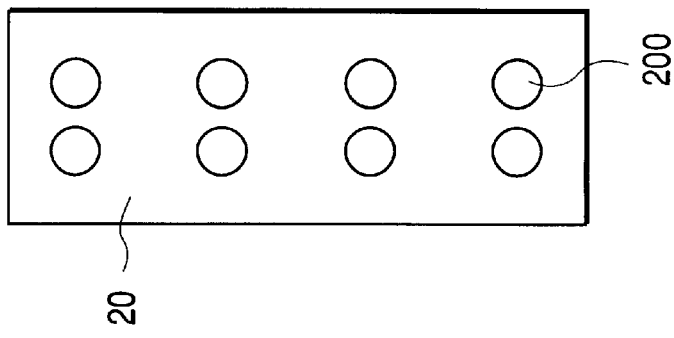
Figure 3:
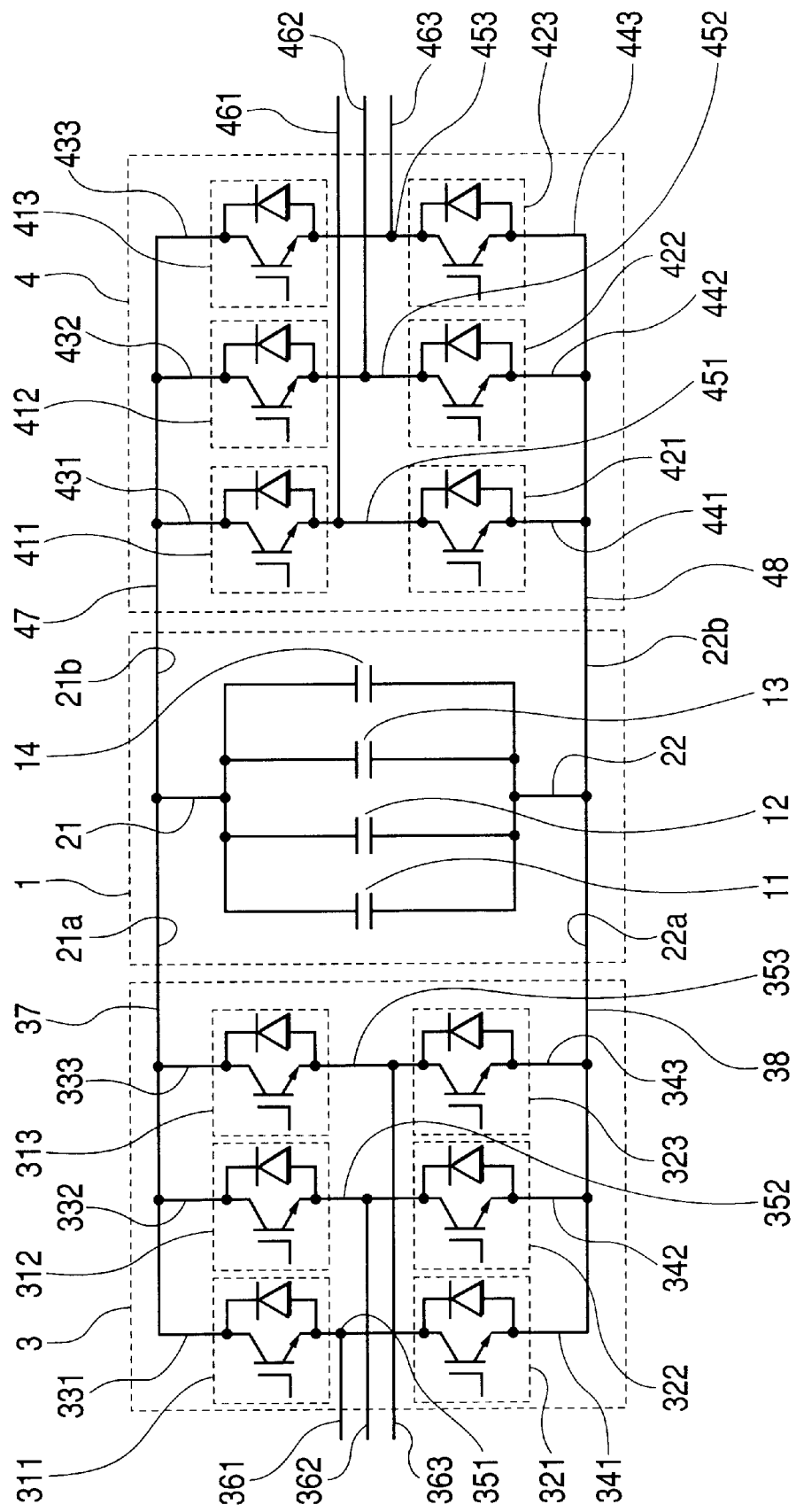
FIG. 3 is a diagram depicting a circuit configuration of an electric power conversion device relating to the invention.
Figure 5A:
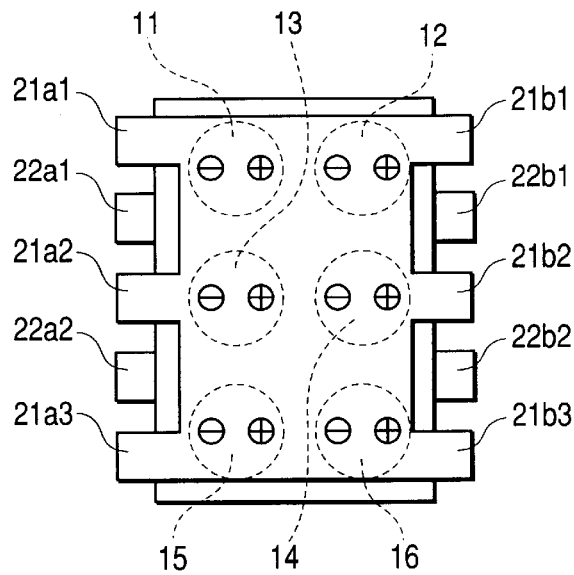
FIGS. 5(a)–5(b) are third embodiments of the invention.
Figure 5B:
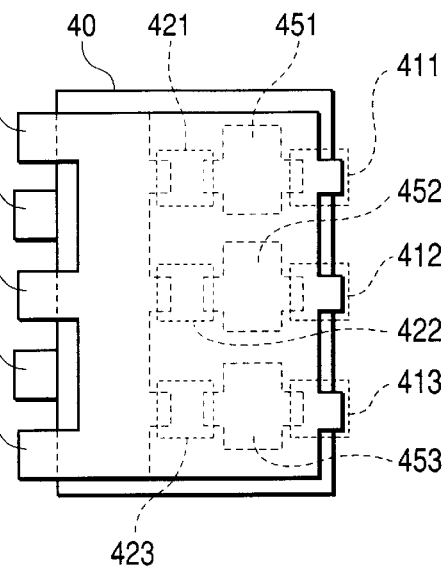
Figure 5C:
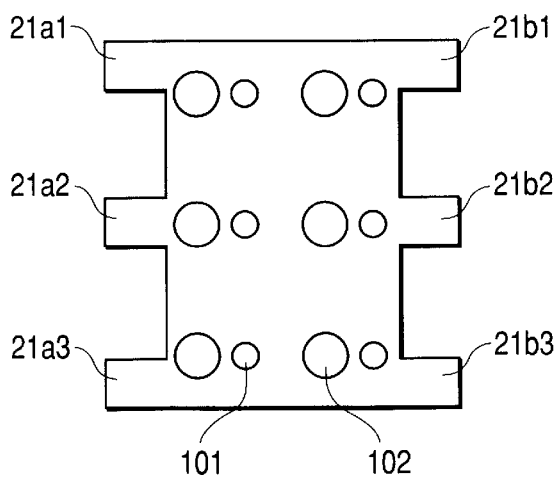
Figure 5D:
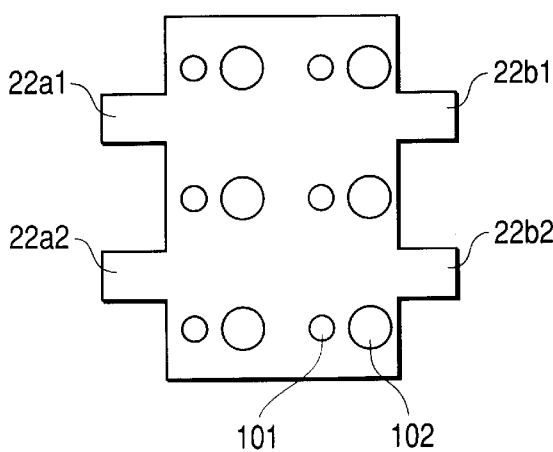

In addition, planar shapes of the positive polarity side conductor 21 and negative polarity side conductor 22 being connected to capacitors are shown in FIG. 2. FIG. 2(a) illustrates a dielectric plate 20 which is interposed or "sandwiched" between conductors; (b) depicts a positive polarity side conductor 21 which has positive the subdivided polarity conductor connection (connecting conductor) sections 21a1–21a3 associated with the converter unit 3 and also the divided positive polarity conductor connection (connecting conductor) sections 21b1–21b3 associated with the inverter unit 4; and, (c) shows a negative polarity side conductor 22 having the subdivided negative polarity conductor connection (connecting conductor) sections 22a1–22a2 associated with the converter unit 3 and also divided negative polarity conductor connection (connecting conductor) sections 22b1–22b2 associated with the inverter section 4.

The examples shown in FIGS. 1 and 2 are such that the capacitors are of a four-parallel array configuration, wherein the connection sections 21a1–21b3 and 22a1–22b2 for connection to conductors 37, 38 of the converter unit and conductors 47, 48 of the inverter unit are present on the both sides of an linear array of capacitors 11–14. Let the positive polarity side conductor 21 and negative polarity side conductor 22 each have a specific structure which permits establishment of electrical isolation relative to a connection section 101 with a capacitor terminal from the other terminals by a technique for forming an opening or hole 102 by way of example. Additionally the positive polarity side conductor 21 and negative polarity side conductor 22 are structurally arranged so that these are insulatively stacked over each other with an insulator 20 sandwiched therebetween.

Here, the positive polarity side conductor 21 is at the top surface where as the negative polarity side conductor 22 is laid out at a location adjacent to the rear-side capacitors 11–14, or vice versa in layout position. In addition, although the capacitors 11–14 are disposed so that their positive terminals are on the right side in the drawing, such layout may be reversed where necessary. In such case, the resultant conductor shape is a shape with the conductors shown in FIG. 2 being mirror-symmetrized respectively; thus, its illustration is eliminated herein. Further note that although in the example shown herein they are connected with the converter 3 on the left side of the drawing and with the inverter 4 on the right side thereof, the reversed layout will also be employable when the need arises.

An arrangement of the inverter unit 4 is as follows. This unit is generally constituted from positive polarity side switching elements 411–413, negative polarity side switching elements 421–423, positive polarity side conductors 413–433, negative polarity side conductors 441–443 and 48, inverter intermediate conductors 451–453 for connection between the positive polarity side switching elements 411–413 and negative polarity side switching elements 421–423, and alternate current (AC) conductors 461–463, not shown. In FIG. 1 a heat sink 5 is shown for cooling down respective switching elements 411–423. If necessary, a snubber circuit or equivalents thereto may be connected, although its illustration is omitted in the drawing.

The conductors 431–433 which are to be connected to the positive terminals of the positive polarity side switching elements 411–413 are made integral with the positive polarity side common conductor 47, which are connected by connection portions 471–473 to the capacitor positive polarity side conductor 21. Similarly the conductors 441–443 that are connected to the negative terminals of negative polarity side switching elements 421–423 are integrated with the negative polarity side common conductor 48, which are connected by connection portions 481–483 to the capacitor negative polarity side conductor 22. Here, the negative polarity side common conductor 48 and positive polarity side common conductor 47 are formed to have a multilayer structure with a dielectric plate 40 sandwiched between them whereas the intermediate conductors 451–453 for connection between the switching elements and positive polarity side common conductor 47 are formed into a multilayer structure with dielectric plate 40 sandwiched therebetween. In some cases, these conductors may alternatively be designed together into a multilayer structure. Also note that although in the drawing the negative polarity side switching elements 421–423 are laid out at locations in close proximity to the connection sections with the capacitor group 1 (on the left side in the drawing) whereas the positive polarity side switching elements 411–413 are disposed at locations far therefrom (on the right side in the drawing), such layout may be reversed if necessary; in such case, the conductors will be reversed in arrangement.

Although AC conductors 361–363 and 461–463 are not depicted in FIG. 1, this part may be designed so that conductive lead wires are connected to the switching elements' terminals because it will be permissible that the part is not so small in inductance. Note however that they are preferably disposed maximally adjacent to each other while retaining electrical isolation therebetween in view of the fact that if three-phase conductors 361–363 15 or 461–463 are too far from one another then harmonic wave components will possibly leak.

The positive polarity side conductor 21 and converter positive polarity side common conductor 37 or alternatively the connection sections 21a1–21b3 associated with the inverter positive polarity side common conductor 47 and the capacitor negative polarity side conductor 22 and converter negative polarity side common conductor 38 or the connection sections 22a1–22b2 associated with the inverter negative polarity side common conductor 48 may be structured in such a manner that conductive plates (e.g. 21b1 and 471) are connectable together by using more than one bolt with these plates being stacked over each other. Although in FIG. 1 the positive polarity side conductor 21's connection sections 21a1–21b3 are six portions in entirety whereas the negative polarity side conductor 22's connection sections 22a1–22b2 are four portions in total, such may be reversed; in this case, the converter conductors 37, 38 and inverter conductors 47, 48 are structured so that their connection portions are identical. While in DC currents and/or low-frequency currents the resistance is lower in value with an increase in conductor width and this will be advantageous for use as electrical connection part, it is possible in cases where high-frequency currents flow in opposite directions to reduce the resulting inductance by forcing such opposite-direction current components to oppose each other as greatly as possible. There are many opposing portions at portions with conductors being stacked over each other so that this effect stays great and thus the inductance will be reduced significantly. Adversely at portions with no multilayers such as connection sections, the inductance is large in value. Although none are multilayered at the connection sections, letting the positive polarity side conductors and negative polarity side conductors be disposed alternately makes it possible to constitute reverse-directional current opposing portions. Due to this, the inductance may be reduced by alternately disposing the positive polarity side conductors and negative polarity side conductors (e.g. neighboring 21a1 and 22a1 upon each other) with the connection sections being subdivided into a great number of portions. However, in view of the necessity for retaining electrical isolation between the positive polarity side conductor 21 and negative polarity side conductor 22, a certain distance for establishment of such isolation is required for the positive polarity side conductor connection section, e.g. 21a1, and the negative polarity side conductor connection section, e.g. 22a1. Although in the illustrative one the connection sections 21a1–22b2 and 471–482 are each formed into a rectangular strip-like shape, other shapes are also employable as far as the isolation is maintained between the positive polarity side and the negative polarity side.

FIG. 4 shows a second embodiment of the invention. This also is the case where capacitors are of the 4-parallel configuration, and is an example which is different from the case of FIG. 1 in that the directions of capacitors 11–14 are changed by 90 degrees causing them to align linearly. Further, this example is a structure example with the connection sections 21a1–21b4 and 22a1–22b4 of the positive polarity side conductor 21 and negative polarity side conductor 22 being subdivided into eight portions respectively. Due to this, in comparison with the case of FIG. 1, a connection part 474 of the positive terminals of positive polarity side switching elements 411–413 of the inverter unit 4 and the capacitor positive polarity side conductor 21 is added thereto; similarly connection parts 483, 484 of the negative terminals of negative polarity side switching elements 421–423 and the capacitor negative polarity side conductor 22 is added.

Comparing to the case of FIG. 1, this embodiment is capable of further reducing the inductance values at the connection sections, by increasing the connection sections to thereby increase current opposing portions. Even in the case of the capacitor group directions such as shown in FIG. 1, it will also be possible to increase the connection sections in the way shown in FIG. 4, which in turn makes it possible to further reduce the inductance as will be readily understandable by those skilled in the art. Additionally, although the terminals of the capacitors 11–14 are such that the positive polarity is at upper part in the drawing whereas the negative polarity lies downward therein, they may be arranged reversely: Furthermore, with regard to certain ones of the capacitors, these may be designed so that the positive polarity is at upper part in the drawing whereas the remaining ones are designed so that their negative polarity are at upper part. It should be noted that in FIG. 4 all the capacitors involved are disposed in the same direction. This causes less errors and thus is preferable in a viewpoint of manufacturing works. It is for this reason that the all-alignment case alone is shown in the drawing.

FIG. 5 shows a third embodiment of the invention. This is an example with six capacitors 11–16 being parallel-connected together. Although as in FIGS. 1 and 4 these six capacitors 11–16 are aligned in a single linear array, they are disposed in two arrays in FIG. 5 to preclude the resultant size from undesirably increase in one direction. FIG. 5(a) shows an arrangement of part relating to the capacitors 11–16 and capacitor conductors 21 and 22; (b) is the arrangement of an inverter unit 4; and, (c) and (d) show the capacitor positive polarity side conductor 21 and capacitor negative polarity side conductor 22. The inverter unit 4 is similar in structure to that shown in FIG. 1; the capacitor conductors 21 and 22 have connection sections 101 with capacitor terminals and dielectric portions 102 as shown in (c) and (d).

It must be noted that even where the capacitors are laid out into two arrays in this way, the capacitors 11–16 may be disposed as shown in FIG. 4 in such a manner that these are 90-degree rotated with respect to FIG. 5; if this is the case, the capacitor terminal sections 101 of capacitor conductors 21 and 22 and the dielectric portions 102 will merely change in position. Thus no specific illustration is shown herein.

FIG. 6 shows a fourth embodiment of the invention. As shown in FIG. 6(a), this is an example which is arranged so that its capacitor group 1 is configured from two-series/four-parallel ones 111–142. This example does require employment of a capacitor intermediate conductor 23 for connection between two-capacitor serial combinations.

Figure 6A:
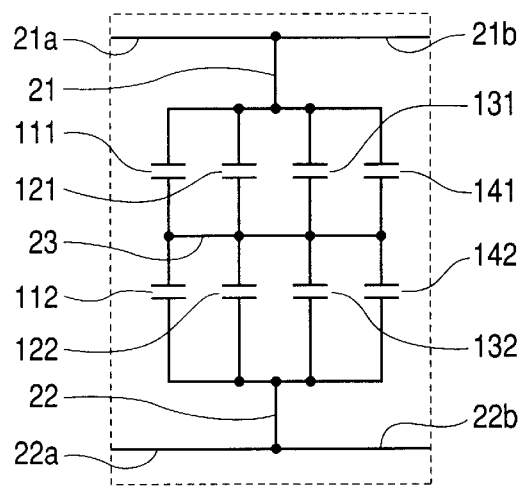
FIGS. 6(a)–6(e) are a fourth embodiment of the invention.
Figure 6B:
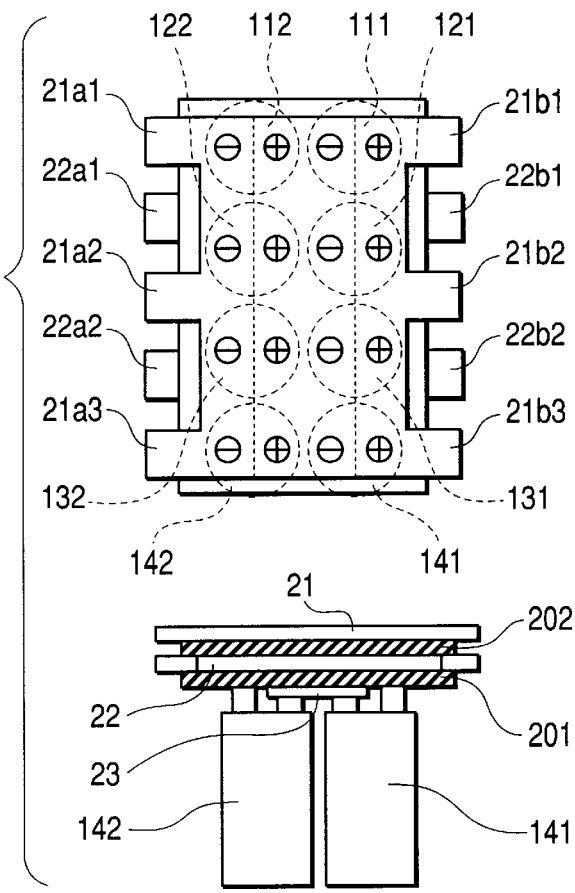
Figure 6C:
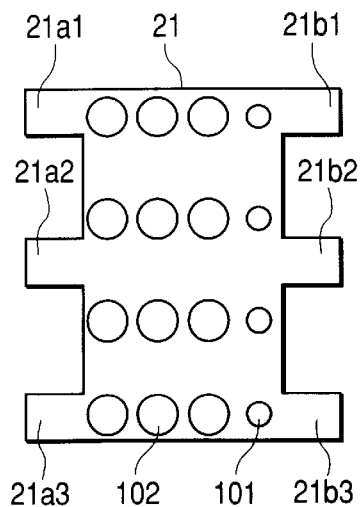
Figure 6D:
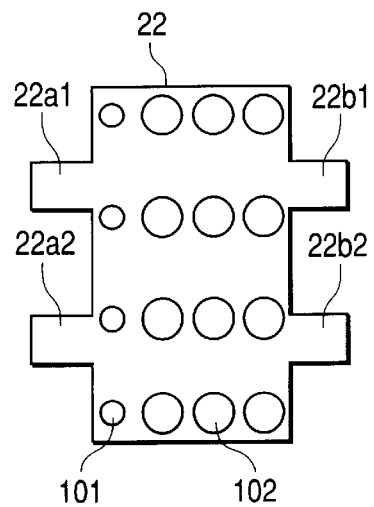
Figure 6E:
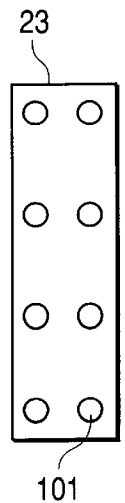

As shown in FIG. 6(b) this embodiment is arranged so that the capacitor negative polarity side conductor 22 is stacked with a dielectric plate 201 laid beneath it while letting the capacitor intermediate conductor 23 be closest in position to the capacitors 111–142 and further that the capacitor positive polarity side conductor 21 is stacked thereover with a dielectric plate 202 sandwiched therebetween. Shown in FIG. 6(c) is a planar shape of each conductor of the capacitor positive polarity side conductor 21 and capacitor negative polarity side conductor 22 plus capacitor intermediate conductor 23. The inverter unit 4 is similar in structure to that shown in FIG. 1; thus, its illustration is omitted herein.

It must be noted here that although the capacitor positive polarity side conductor 21 is situated on the outermost side, the capacitor negative polarity side conductor 22 may alternatively be on the outermost side.

Note however that it will be most preferable that the capacitor intermediate conductor 23 be placed midway between the above conductors due to the fact that it is no longer required to be connected with the converter unit 3 and inverter unit 4; for the very reason, such is done in the one shown in the drawing. Also note that it is an ordinary approach to connect thereto a voltage-division resistor for equalization of voltages applied to the two series-connected capacitors. To do this, more than one terminal therefor will sometimes be provided at the capacitor intermediate conductor 23; however, any illustration thereof is eliminated herein.

Figure 7A:
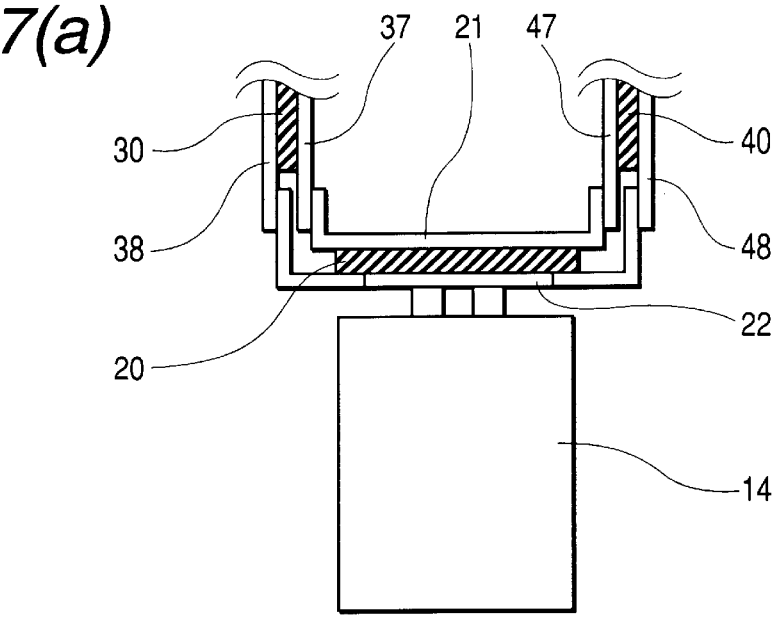
FIGS. 7(a)–7(b) are a fifth embodiment of the invention.
Figure 7B:
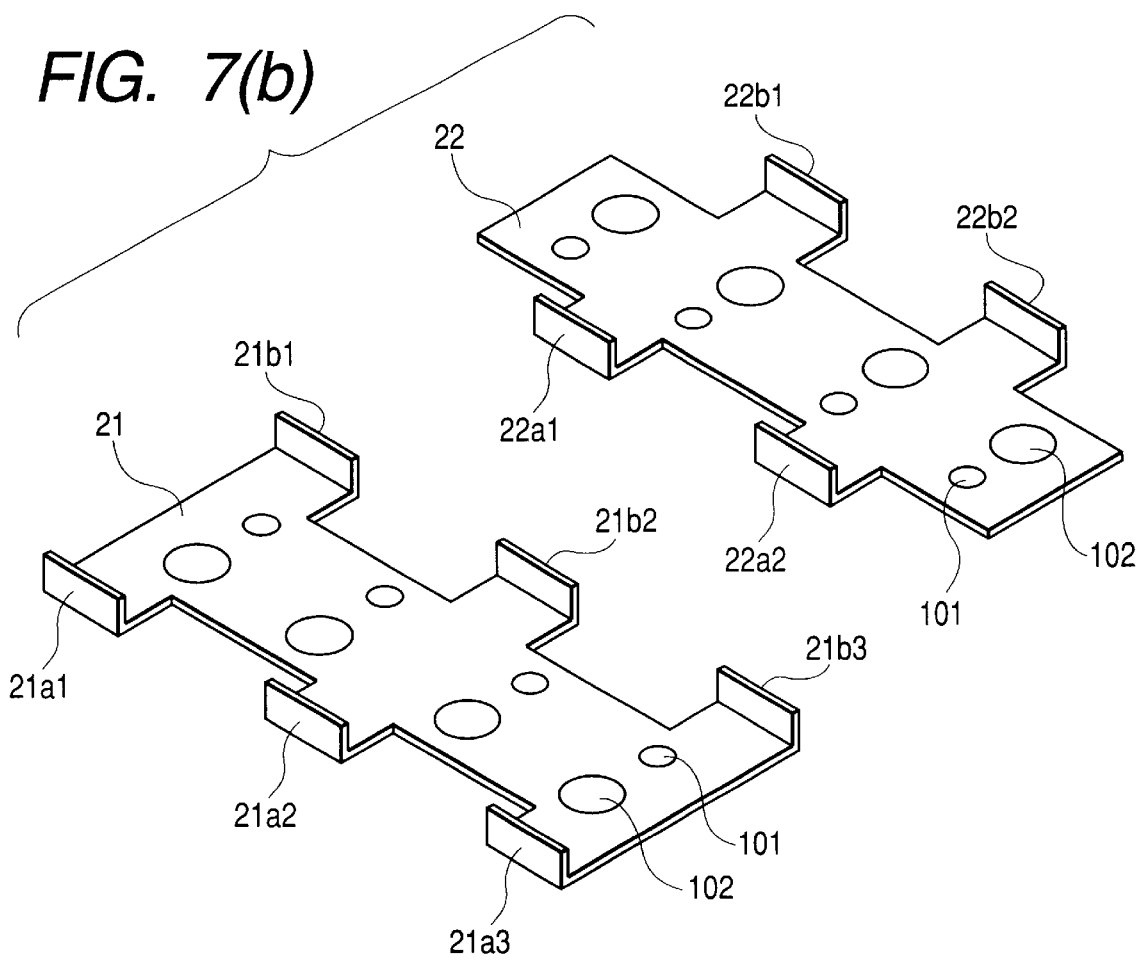

FIG. 7 shows a fifth embodiment of the invention. As shown in FIG. 7(a), this is an example in which the plane of a capacitor conductor 21 or 22 and the plane of converter conductor 37 or 38 and the plane of inverter conductor 47 or 48 are not in parallel—here, these planes are crossed together substantially perpendicularly. While the capacitor positive polarity side conductor 21 and capacitor negative polarity side conductor 22 are shown in (b), employing a specific structure with the connection sections 21a1–22b2 being partly folded and curved permits the mutually perpendicular converter conductors 37, 38 to be connected with the inverter conductors 47, 48. Although in the embodiment shown herein the connection sections 21a1–22b2 of the capacitor conductors 21 and 22 are folded into curved shape, similar results are obtainable when employing a structure (not shown) in which the connection portions 471–482 of inverter conductors and the connection sections of converter conductors are folded.

Although in the embodiment stated above the connection sections 21a1–22b4 are illustrated so that each is the same in width as the others, they are modifiable to be different in width from one another. In the embodiments of FIGS. 6 and 7, the connection sections 22a1–22b2 of the negative polarity side conductors are less than the connection sections 21a1–22b3 of positive polarity side conductors. In case a current flowing in this part is at relatively low frequencies, such current is expected to flow with distribution across the entire width; thus, a structure is employable in which the connection sections 22a1–22b2 of negative polarity side conductors are widened causing a total value of widths of two portions to be the same as a total value of widths of three portions on the positive polarity side.

Figure 8A:
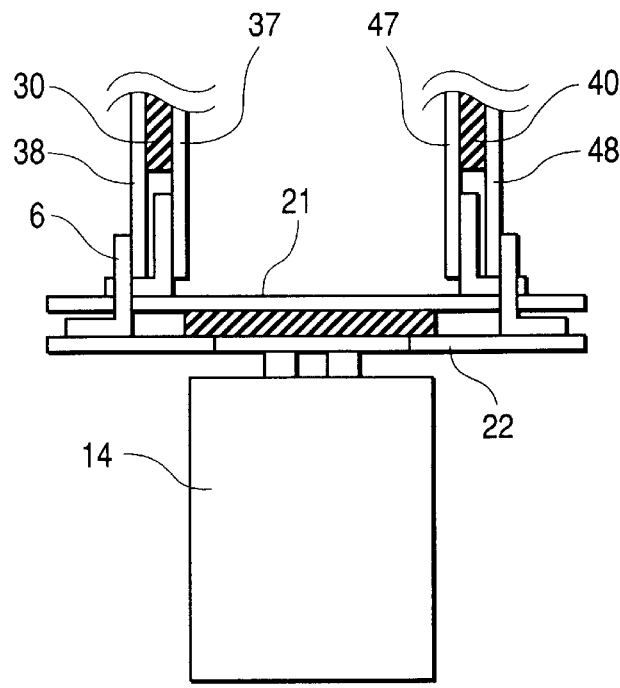
FIGS. 8(a)–8(c) are a sixth embodiment of the invention.
Figure 8B:
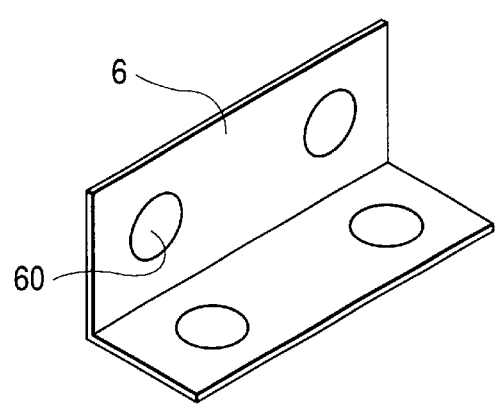
Figure 8C:
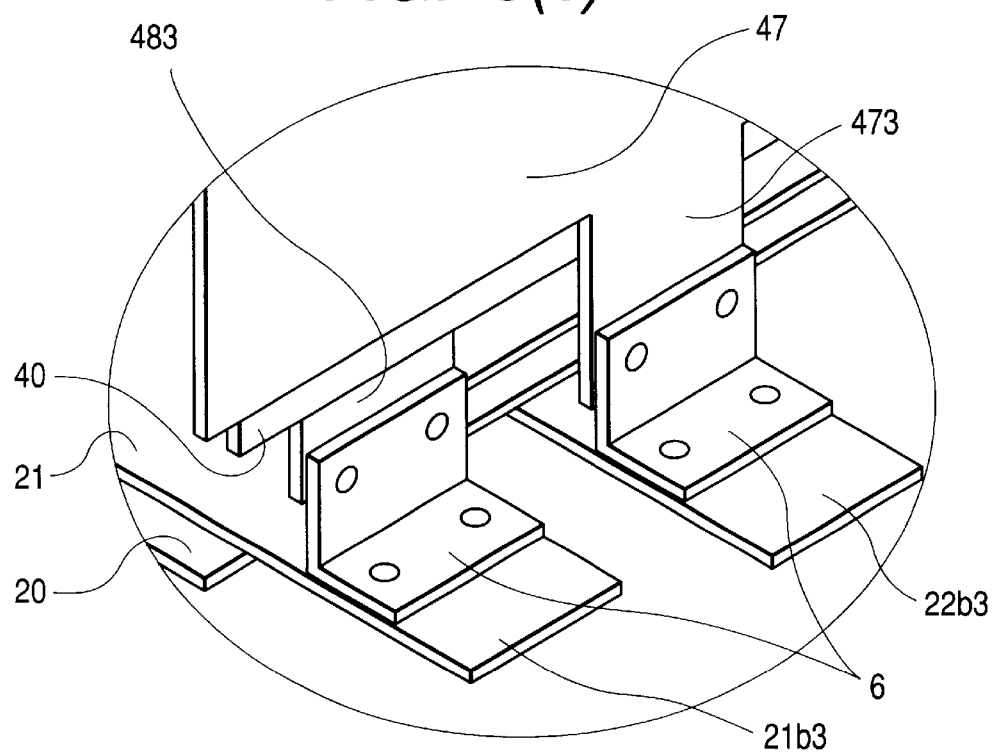

FIG. 8 shows a sixth embodiment of the invention. As shown in FIG. 8(a), this is an example (similar to that of FIG. 7) of the case where the plane of the capacitor conductors 21 and 22 is substantially perpendicular to the plane of the converter conductors 37, 38 and inverter conductors 47, 48, wherein the connection sections are not folded unlike the example shown in FIG. 7 but are connected by use of "L"-like connecting conductors 6 as shown in (b). These connection conductors 6 require the use of a connection means 60 for connecting them to respective conductors.

There is shown in (c) a detailed structure of part of a connection arrangement using such connection conductors 6.

While the use of such arrangement would result in an increase in number of components required, it is possible to suppress or "moderate" size/dimension common differences of conductors and parts supporting them at the connection sections of the connection conductors 6, which in turn becomes convenient for works. In such case, the connection conductors 6 may be designed to have a one-way selected size as far as the connection sections are uniform in width, resulting in a decrease in production costs.

Figure 9A:
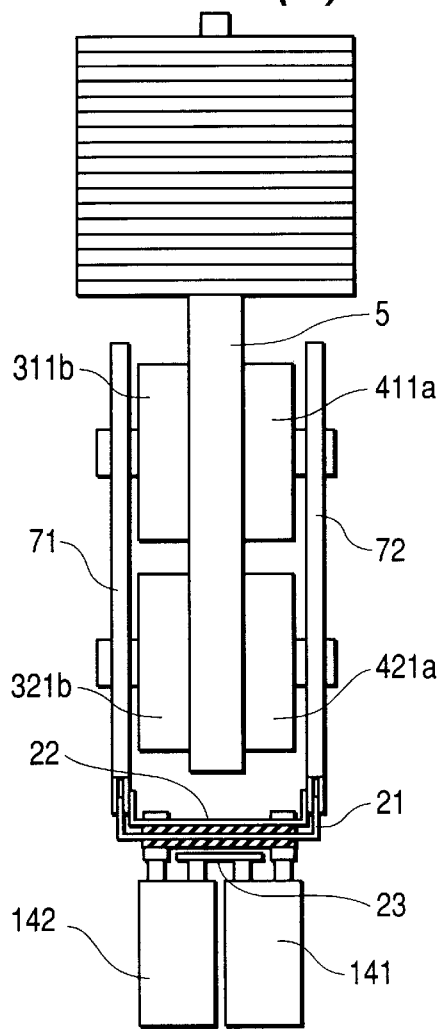
FIGS. 9(a)–9(c) are a diagram showing a single-phase unit in a seventh embodiment of the invention.
Figure 9B:
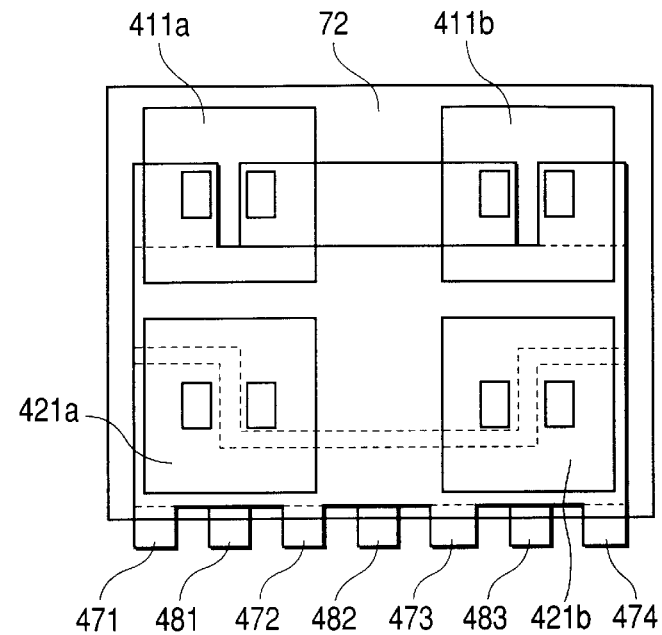
Figure 9C:
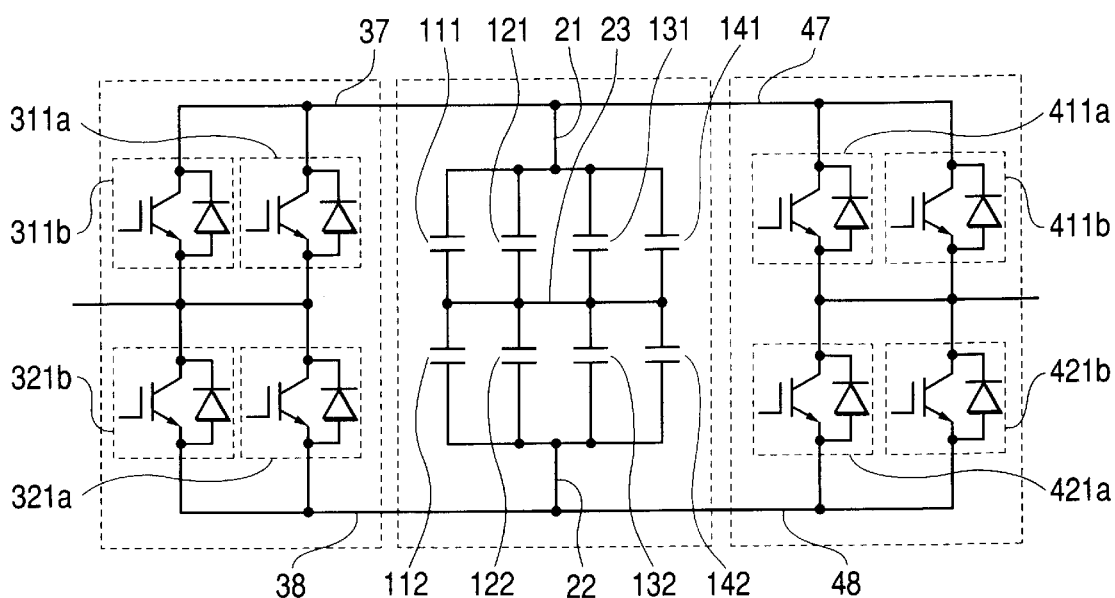

FIG. 9 shows a seventh embodiment of the invention. FIG. 9(a) is the one that integrates into a single assembly unit a single-phase part of the converter 3 and single-phase part of the inverter 4 plus part of a smoothing capacitor group 1, which are shown in FIG. 9(c). Shown herein is the case where each switching element is used in two-parallel configuration. An attempt is made to increase the capacity of the converter device by increasing the parallel array number in accordance with a current required and/or by increasing the series array number in accordance with a voltage required.

In FIG. 9(a), switching elements 311a–321b which constitute a single phase of the converter 3 are attached to the left side of a heat sink 5 whereas switching elements 411a–421b making up a single phase of the inverter 4 are attached to the right side thereof. FIG. 9(b) shows a plan view of the structure shown in FIG. 9(a). This will be effective when some difficulties are found to successfully cool down the switching elements of all of the three phases by a single piece of heat sink 5 in cases where the converter device becomes larger in capacity. Although in the circuit configuration of FIG. 9(c) the switching elements 311a–421b are organized into 2-parallel circuitry, any alternative arrangements with the switching elements changed in parallel array number may be employed in a way conformity with the converter capacity. Also note that certain conductors for connection to the switching elements 311a–321b and 411a–421b are indicated by an "assembled" converter single-phase multilayer conductor 71 and an assembled inverter single-phase multilayer conductor 72 for purposes of convenience in illustration only. Either one is employable of the arrangement with the dielectric plate 40 sandwiched as shown in FIG. 1 and the case where an assembled multilayer conductor is designed with a dielectric layer interposed between conductors.

It should be noted that although unlike the embodiments stated supra the example of FIG. 9(a) is arranged so that the capacitor positive polarity side conductor 21 is in close proximity to the capacitor intermediate conductor 23 while letting the capacitor negative polarity side conductor 22 be disposed on the outermost side, either one is freely employable as far as the connection sections with the converter single-phase conductor 71 and inverter single-phase conductor 72 are identical thereto.

Figure 10:
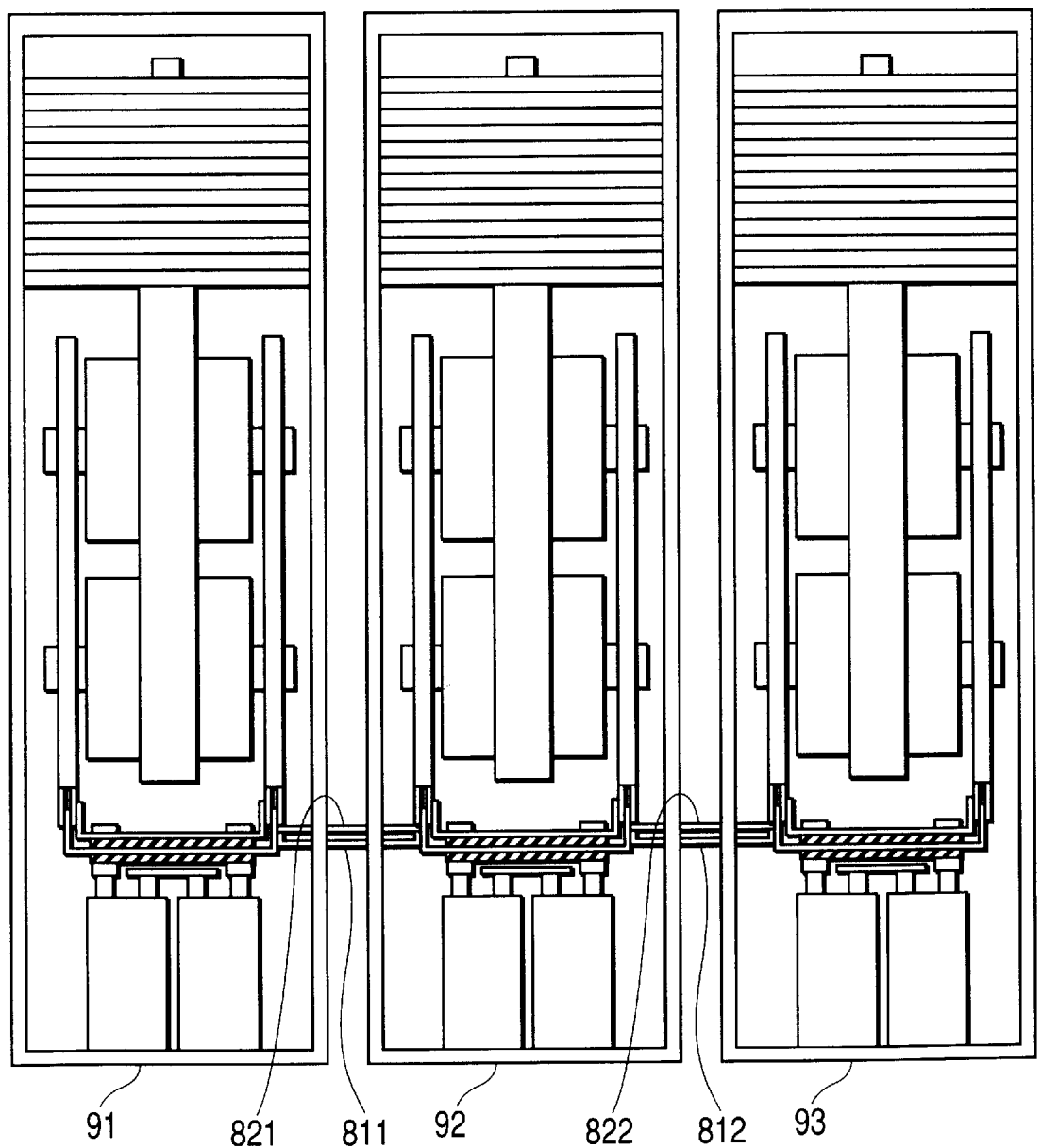
FIG. 10 is a three-phase configuration diagram of the seventh embodiment of the invention.

FIG. 10 shows an example for constitution of three-phase electric power conversion apparatus by connecting together three separate ones of the single-phase unit shown in FIG. 9. In this case, converter-to-inverter single-phase units 91–93 are connected by conductors 811–822. Using such "per-phase" unit structure arranged in this way makes it possible to reduce resultant sizes of unitary parts or components, resulting in achievement of miniaturization or "downsizing" of the entire apparatus and also improvements in workabilities. Regarding connection conductors between associated ones of the single-phase units 91–93 also, connecting them to the connection sections 21a1–22b3 for connection between the capacitor group 1 and the converter 3 or inverter 4 results in positive polarity-side interphase conductors 811, 812 and negative polarity-side interphase conductors 821, 822 being disposed alternately, which leads to a capability to reduce the inductance at this part.

As apparent from the foregoing description, in accordance with the present invention, the multilayer structure is obtainable through subdivision of connection sections on a per-unit basis relative to the converter, inverter and capacitors; thus, the assembly and manufacture may be made easier while enabling reduction of apparatus costs and miniaturization thereof.

Another advantage is that since the positive polarity side conductors and negative polarity side conductors being connected to capacitors are divided into a plurality of portions and then connected to the converter conductors and inverter conductors to thereby ensure that resultant current flow directions become the reverse directions, it is possible to achieve improvement in inductance reduction, which in turn makes it possible to suppress any possible jump-up voltages during switching.

A further advantage lies in an ability to reduce errors during working by specifically designing respective capacitors making up the capacitor group so that these are the same in size with one another and also are disposed in the same direction.

Another further advantage lies in an ability to reduce the types of parts or components to thereby reduce costs, which is resulted from equalization of widths of all the connection conductors as has been divided with respect to each unit of the converter, the inverter and the capacitors.

A still another advantage is that letting the converter-side connection conductors subdivided and the subdivided inverter-side connection conductors have the same shape makes it possible to reduce costs in the manufacture of conductors.

Still another further advantage is that the inductance may be further reduced by subdivision while letting the total parts number of the subdivided converter positive polarity-side connection conductors and the divided inverter negative polarity-side connection conductors be greater than the requisite number of parallel-connected capacitors included in the capacitor group.

Yet another further advantage lies in a capability to well accommodate a further increase in size of the electric power converter device by constituting a single-phase unit of the power converter device incorporating the principles of the invention and then designing a multi-phase power converter apparatus by connecting a plurality of such units together.

What is claimed is:

1. A semiconductor electric power conversion device including a converter unit and an inverter unit each having a group of parallel-connected capacitors and a plurality of positive polarity side switching elements being connected to a positive polarity terminal of the capacitor group plus a plurality of negative polarity side switching elements as connected to a negative polarity terminal of said capacitor group, characterized by comprising:

a first connection section for connecting together a first conductor being connected to the positive terminal of said capacitor group and a second conductor as connected to the positive polarity of the positive polarity side switching elements making up said inverter and a second connection section for connecting thereto a third conductor as connected to the positive polarity of the positive polarity side switching elements making up said inverter; and a third connection section for connecting together a fourth conductor being connected to the negative terminal of said capacitor group and a fifth conductor as connected to the negative polarity of the negative polarity side switching elements making up said converter and a fourth connection section for connecting thereto a sixth conductor as connected to the negative polarity of the negative polarity side switching elements constituting said inverter, wherein said first conductor and said fourth conductor are formed to have a multilayer structure while letting said second conductor and said fifth conductor be formed into a multilayer structure with said third conductor and said sixth conductor being formed into a multilayer structure.

2. The semiconductor electric power conversion device as recited in claim 1, characterized in that respective capacitors making up said capacitor group are on the same plane while disposing said first connection section and said third connection section on the same side with respect to an infinite plane containing therein a line segment coupling together at least two terminals of the terminals of said capacitor group and being at right angles to said plane and also disposing said second connection section and said fourth connection section be disposed at the opposite side thereto, wherein said first to fourth connection sections have a plurality of subdivided connection conductors with said first connection section and said third connection section being disposed in close proximity to each other in the state that these are electrically isolated from each other and also with said second connection section and said fourth connection section being disposed adjacent to each other in the state that these are electrically isolated from each other.

3. The semiconductor electric power conversion device as recited in claim 1, characterized in that respective capacitors making up said capacitor group are all the same in shape and are disposed in the same direction.

4. The semiconductor electric power conversion device as recited in claim 1, characterized in that the subdivided connection conductors of said first to fourth connection sections are all the same in width.

5. The semiconductor electric power conversion device as recited in claim 1, characterized in that the connection conductors of said first connection section and said second connection section are subdivided into the same number of portions and that the connection sections of said third connection section and said fourth connection section are divided into the same number of portions.

6. The semiconductor electric power conversion device as recited in claim 1, characterized in that a total number of the subdivided connection conductors of said first connection section and said third connection section is greater than the number of the parallel-connected capacitors in said capacitor group.

7. The semiconductor electric power conversion device as recited in claim 1, characterized in that a plurality of single-phase units are connected for constitution of a multiple-phase electric power conversion unit.

* * * * *